(12) United States Patent
Beatty et al.

(10) Patent No.: US 12,244,197 B2
(45) Date of Patent: Mar. 4, 2025

(54) STATOR WITH OUTER DIAMETER BUS BAR CONNECTION

(71) Applicant: BorgWarner Inc., Auburn Hills, MI (US)

(72) Inventors: Timothy Beatty, Carmel, IN (US); David Lee Durant, Anderson, IN (US); Ryan J. Jones, Pendleton, IN (US); Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 274 days.

(21) Appl. No.: 17/862,292

(22) Filed: Jul. 11, 2022

(65) Prior Publication Data

US 2023/0016106 A1   Jan. 19, 2023

Related U.S. Application Data

(60) Provisional application No. 63/221,720, filed on Jul. 14, 2021.

(51) Int. Cl.
  *H02K 3/50*   (2006.01)
  *H02K 9/22*   (2006.01)

(52) U.S. Cl.
  CPC ............... *H02K 3/50* (2013.01); *H02K 9/223* (2021.01); *H02K 2203/09* (2013.01)

(58) Field of Classification Search
  CPC ............ H02K 3/50; H02K 3/505; H02K 3/28; H02K 2203/09; H02K 9/223; H02K 9/22
  USPC ........................................................ 310/71
  See application file for complete search history.

(56) References Cited

U.S. PATENT DOCUMENTS

| | | |
|---|---|---|
| 6,445,097 B1 | 9/2002 | Zeiler et al. |
| 7,135,793 B2 | 11/2006 | Seguchi et al. |
| 8,546,986 B2 | 10/2013 | Marchitto et al. |
| 8,716,910 B2 | 5/2014 | Edrington |
| 9,660,495 B2 | 5/2017 | Brzuska et al. |
| 9,768,655 B2 | 9/2017 | Neet |
| 9,941,762 B2 | 4/2018 | Tamura |
| 9,954,408 B2 | 4/2018 | Nakamura et al. |
| 10,069,364 B2 | 9/2018 | Magri et al. |
| 10,153,674 B2 | 12/2018 | Tsuiki et al. |
| 10,239,154 B2 | 3/2019 | Ciampolini et al. |
| 10,250,096 B2 | 4/2019 | Nishikawa et al. |
| 10,256,693 B2 | 4/2019 | Jang et al. |

(Continued)

*Primary Examiner* — Michael Andrews
(74) *Attorney, Agent, or Firm* — Maginot, Moore & Beck, LLP

(57) ABSTRACT

A stator for an electric machine comprises a cylindrical core defining an inner cylindrical surface and an outer cylindrical surface with a plurality of slots formed between the inner cylindrical surface and the outer cylindrical surface. Windings are positioned on the cylindrical core. The leads of the windings include a plurality of inner leads associated with conductors in an inner layer of the slots and a plurality of outer leads associated with conductors in an outer layer of the slots. A bus bar assembly includes a plurality of inner bus bars and a plurality of outer bus bars, the plurality of inner bus bars connected to the plurality of inner leads, and the plurality of outer bus bars connected to the plurality of outer leads. The plurality of outer bus bars are positioned radially outward from the end turns of the windings and radially inward from the outer cylindrical surface.

20 Claims, 7 Drawing Sheets

(56) References Cited

U.S. PATENT DOCUMENTS

| | | |
|---|---|---|
| 10,277,088 B2 | 4/2019 | Ciampolini et al. |
| 10,298,083 B2 | 5/2019 | Okamoto et al. |
| 10,424,983 B2 | 9/2019 | Takasaki |
| 10,505,423 B2 | 12/2019 | Dang |
| 10,892,658 B2 | 1/2021 | Jang et al. |
| 10,998,789 B2 | 5/2021 | Tategata et al. |
| 11,146,136 B2 | 10/2021 | Alsman et al. |
| 11,165,301 B2 | 11/2021 | Alsman et al. |
| 2003/0214190 A1 | 11/2003 | Congdon et al. |
| 2009/0127948 A1 | 5/2009 | Shimizu et al. |
| 2012/0187783 A1* | 7/2012 | Edrington ............... H02K 3/28 310/71 |
| 2014/0232223 A1* | 8/2014 | Takasaki ............... H02K 3/28 310/71 |
| 2017/0033619 A1* | 2/2017 | Tamura ............... H02K 3/28 |
| 2017/0310183 A1 | 10/2017 | Jang et al. |
| 2019/0157934 A1 | 5/2019 | Kawaguchi et al. |
| 2019/0305639 A1* | 10/2019 | Seki ............... H02K 9/00 |
| 2020/0412195 A1 | 12/2020 | Mayer et al. |
| 2021/0135531 A1 | 5/2021 | Iga et al. |
| 2021/0143699 A1* | 5/2021 | Alsman ............... H02K 3/28 |
| 2022/0029490 A1 | 1/2022 | Alsman et al. |
| 2022/0239178 A1* | 7/2022 | Ogawa ............... H02K 3/50 |

\* cited by examiner

STATOR WITH OUTER DIAMETER BUS BAR CONNECTION

CROSS-REFERENCE TO RELATED APPLICATIONS

This application claims priority from U.S. provisional patent application No. 63/221,720, filed Jul. 14, 2022, the entire contents of which are incorporated by reference herein.

FIELD

This application relates to the field of electric machines, and more particularly, winding arrangements and terminal connections for electric machines.

BACKGROUND

Electric machines are designed to meet specific operating requirements and space constraints. Examples of design features that contribute to operating performance include stator size, rotor size, type and arrangement of the windings, and any of various other design parameters as will be recognized by those of ordinary skill in the art. All operating requirements for the electric machine must be met while also meeting certain space constraints that are dependent upon the application for the electric machine. For vehicle applications, space within the engine compartment is limited, and designers must be concerned with the overall diameter and length of the electric machine. Accordingly, limiting the size of an electric machine without sacrificing performance features is important.

Electric machine stators include windings that are positioned on a stator core. The windings include conductors that extend through the slots of the stator core, end turns that extend between the conductors in the slots, and numerous leads that extend from certain conductors within the slots. These stators often require a bus bar having copper tracks that make the following connections at the leads in order to complete one or more of the following: (i) connect parallel leads, (ii) create the neutral point for the winding arrangement, (iii) route phase leads to a connection point for an inverter, and (iv) connect leads in order to create series connections for winding paths. All of these connections tend to fight with each other for the same space. Consequently, the bus bars can become quite tall in an axial direction (i.e., as defined by an axis extending through a center of the stator core), extending beyond the winding end turns.

In view of the above, it can be difficult to properly package the stator and the bus bar assembly within the limited space of the vehicle engine compartment. The problem is worsened when even more leads are associated with the winding because of the winding having an increased number of slots per pole per phase, an increased number of parallel wires per phase, or an increased number of phases. The problem is particularly worsened with a stator requiring series connections between winding paths and a high number of slots per pole per phase (e.g., three or four).

In view of the foregoing, it would be desirable to provide a stator for an electric machine with an alternative bus bar configuration that results in a reduced length of the stator, and especially stators having windings with an increased number of slots per pole per phase, an increased number of parallel wires per phase, an increased number of phases, an increased number of series connections, and/or a high number of slots per pole per phase. It would be of further advantage if such stator could be easily manufactured, thus reducing manufacturing time and costs. While it would be desirable to provide a stator that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, a stator for an electric machine comprises a cylindrical core, windings, and a bus bar assembly. The cylindrical defines an inner cylindrical surface and an outer cylindrical surface with a plurality of slots formed between the inner cylindrical surface and the outer cylindrical surface. The windings are positioned on the cylindrical core. The windings include in-slot portions extending through the slots, end turns, and leads, the leads of the windings including a plurality of inner leads associated with conductors in an inner layer of the slots and a plurality of outer leads associated with conductors in an outer layer of the slots. The bus bar assembly includes a plurality of inner bus bars and a plurality of outer bus bars, the plurality of inner bus bars connected to the plurality of inner leads, and the plurality of outer bus bars connected to the plurality of outer leads. The plurality of outer bus bars are positioned radially outward from the end turns of the windings and radially inward from the outer cylindrical surface.

In accordance with another embodiment of the disclosure, a stator for an electric machine comprises a core defining a plurality of slots, windings positioned on the core, the windings including in-slot portions, end turns, and leads, the leads of the windings including a plurality of inner leads associated with conductors in an inner layer of the slots and a plurality of outer leads associated with conductors in an outer layer of the slots. The stator further comprises a bus bar assembly including a plurality of inner bus bars and a plurality of outer bus bars retained by a support. The plurality of inner bus bars are connected to the plurality of inner leads, and the plurality of outer bus bars are connected to the plurality of outer leads. The plurality of inner bus bars are positioned axially outward from tips of the end turns. The plurality of outer bus bars are positioned radially outward from the end turns and axially inward from the tips of the end turns.

In accordance with yet another embodiment of the disclosure, a bus bar assembly comprises a plurality of inner bus bars including a plurality of phase connection bars and a neutral connection bar, each of the inner bus bars including a circumferential portion and a plurality of axial connection arms. The bus bar assembly further comprises a first support engaging each of the inner bus bars, the first support including a first non-conductive arc portion. Additionally, the bus bar assembly comprises a plurality of outer bus bars positioned radially outward from the plurality of inner bus bars, each of the outer bus bars including a circumferential portion extending between two axial connection arms. The bus bar assembly also comprises a second support engaging each of the outer bus bars, the second support including a second non-conductive arc portion with at least one axial leg extending from the second non-conductive arc portion. The neutral connection bar is positioned between the first support and the second support.

The above described features and advantages, as well as others, will become more readily apparent to those of ordinary skill in the art by reference to the following detailed description and accompanying drawings.

DESCRIPTION

Figure 1:
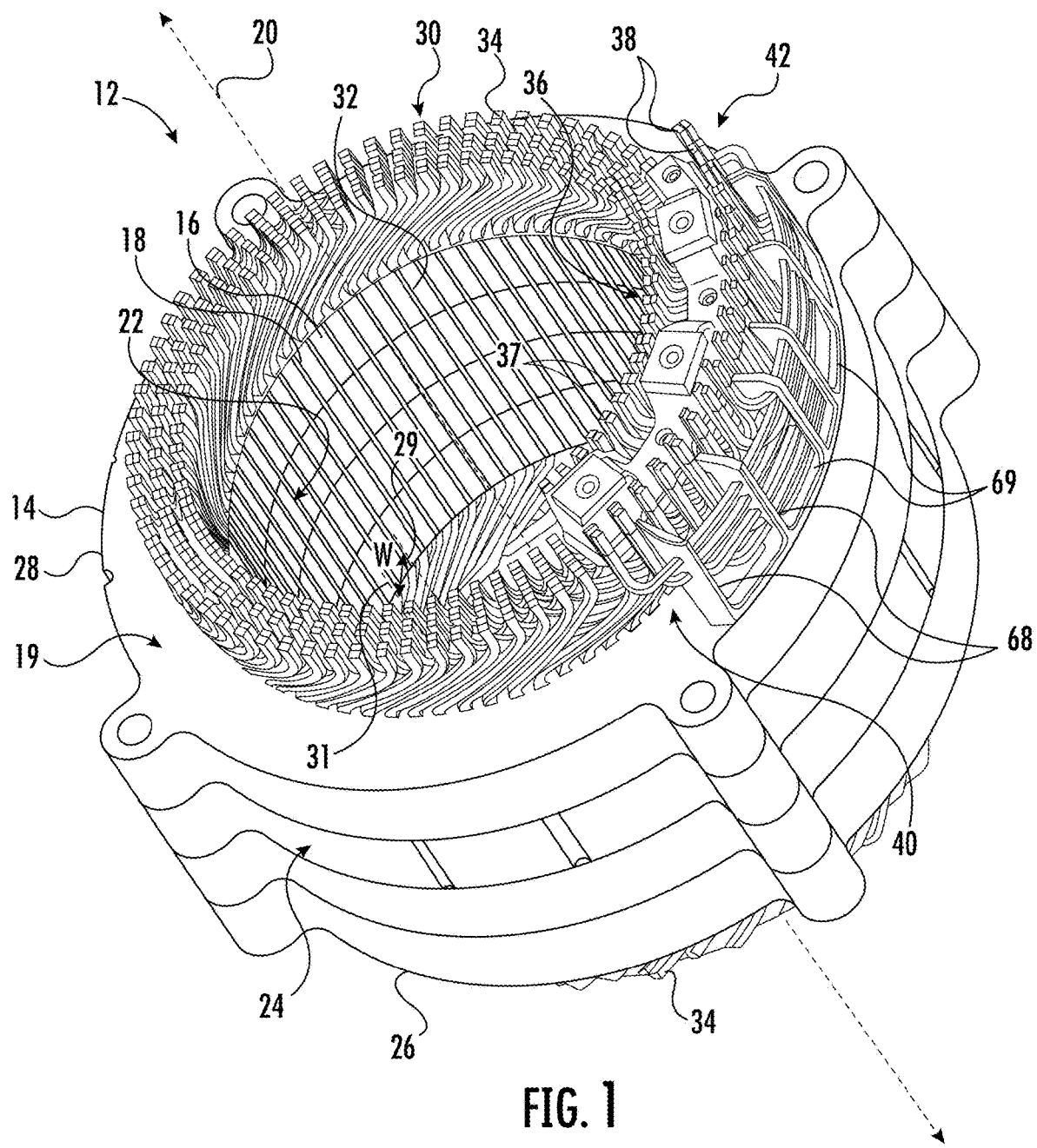
FIG. 1 is a perspective view of a stator including a stator core and a two part bus bar assembly providing outer diameter series connections and inner diameter phase connections for stator windings.

With reference to FIG. 1, an electric machine includes a stator 12 with a bus bar assembly 40 positioned thereon. The stator 12 includes a stator core 14 with a winding arrangement 30 positioned on the core 14. A rotor of the electric machine (not shown) is configured to be rotatably mounted within the core 14. The winding arrangement 30 includes a plurality of phase windings, each of the phase windings terminating in one of a plurality of leads 36. The bus bar assembly 40 is provided at one end of the stator assembly 12 and is electrically connected to the winding leads 36. As described herein, the bus bar assembly 40 is positioned both axially outward and radially outward from the end turns 34 of the winding arrangement 30. At the same time, the bus bar assembly 40 is also positioned radially inward from the outer diameter of the stator core (i.e., within the cylindrical space defined by the stator core and extending axially past the ends of the stator core).

Stator Core and Windings

With continued reference to FIG. 1, the stator core 14 is comprised of a ferromagnetic material and is typically formed from a plurality of steel sheets that are stamped and stacked upon one another to form a lamination stack. The stator core 14 is generally cylindrical in shape as defined by a center axis 20, and includes a cylindrical inner perimeter surface 22, and a cylindrical outer perimeter surface 24. The inner perimeter surface 22 defines an inner diameter (ID) for the stator assembly 12 (which may also be referred to herein as an inner cylindrical surface). The outer perimeter surface 24 defines an outer diameter (OD) for the stator assembly 12 (which may also be referred to herein as an inner cylindrical surface). A plurality of teeth 16 are formed on the interior of the stator core 14 and directed inwardly toward the center axis 20. Each tooth 16 extends radially inward and terminates at the inner perimeter surface 22. Axial slots 18 are formed in the stator core 14 between the teeth 16.

The slots 18 defined by the teeth 16 may be open along the inner perimeter surface 22 of the stator core 14, or may be semi-closed slots with each slot 18 having a smaller width near the inner perimeter surface 22 than the width closer to the outer perimeter surface 24. Openings to the slots 18 are provided through the inner perimeter surface as well as through both ends of the stator core 14. Each slot 18 is defined between adjacent teeth 16, with two adjacent teeth forming two opposing radial walls for one slot. Because the slots 18 are positioned radially inward on the stator core 14, the outer portion of the stator core is free of slots 18. A shoulder 19 is formed at each end of the stator between the outer perimeter surface 24 and the slots.

The stator core 14 is configured to retain the winding arrangement 30 (which may also be referred to herein as "windings") within the slots 18 of the stator core 14. In at least one embodiment, the winding arrangement 30 is formed from a plurality of elongated wires (e.g., copper wires) that are continuously wound within the slots 18 on the stator core 14 in order to form the windings. In at least one alternative embodiment, the winding arrangement 30 is formed from a plurality of segmented conductors (e.g., copper conductor segments, which are sometimes referred to as "hairpin" or "U-turn" conductors), as will be recognized by those of skill in the art. The segmented conductors are inserted into the slots 18 from a first end 26 (e.g., an "insertion end") of the stator core 14. The segmented conductors are connected together at an opposite end 28 (e.g., a "weld end") of the stator core 14.

The conductors of the completed winding arrangement 30 form a plurality of phase windings. In at least one embodiment, the winding arrangement includes three phase windings (e.g., phase U windings, phase V windings, and phase W windings) with multiple paths for each phase. The three phase windings may be star ("Y") or delta ("Δ") connected, depending on the desired winding configuration.

The conductors that form the completed windings 30 on the stator core include in-slot portions 32, end turns 34, and winding leads 36. The in-slot portions 32 are straight portions of the conductors that extend through the slots 18 of the stator core 14. Each in-slot portion 32 carries current from one end 26/28 of the stator core 14 to the opposite end 28/26 of the stator core. As will be recognized by those of skill in the art, the in-slot portions 32 may be aligned in a single file line in each slot from, and each position in the line may be referred to a conductor "layer". For example, each slot 18 may include four layers, six layers, eight layers, or some other number of layers of conductors arranged in a single file line from an innermost layer to an outermost layer.

With continued reference to FIG. 1, the end turns 34 connect the in-slot portions of the windings. In particular, each end turn 34 connects one in-slot portion in a first slot to another in-slot portion in a second slot. The number of slots spanned by the end turn defines a "pitch" of the end turn (e.g., five, six, seven pitch, etc.). When the windings are formed from segmented conductors, the end turns 34 include bent portions (also referred to as "U-turns") arranged on an insertion end of the core, and welded portions on a connection end (also referred to as a "weld end") of the stator core. In this case, each segmented conductor includes a first leg that extends through one slot, a second leg that extends through another slot, and U-turn that extends between the two legs. The U-turns provide end turns 34a on the insertion end 26 of the core 14. The leg ends that extend from the connection end 28 of the stator are bent to form adjacent leg ends. Adjacent leg ends are welded or otherwise connected together in order to form end turns 34b on the connection end 28 of the stator core.

The windings 30 and the stator core 14 define various stator dimensions. For example, the cylindrical shape of the stator core 14 may be defined by the OD and the ID. Additionally, length of the stator core 14 in the axial direction is defined by the distance between the axial-facing surface on the connection end and the opposing axial-facing surface on the weld end. With respect to the windings 30, because the winding end turns 34 extend past the stator core 14 in the axial direction, the axial length of the windings 30 is greater in the axial length of the stator core 14. The axial length of the windings 30 may be defined by the distance between the tips of the end turns 34 at opposite ends 26, 28 of the stator core 14. The "tip" of an end turn 34 may be considered to be the outermost point/region on the end loop in the axial direction from the stator core 14. If the tips of the end turns 34 on each side of the stator are considered to lie in a single plane, the axial length of the windings 30 may be defined as the distance between these two planes. Additionally, the winding 30 has a width, w, that is defined between inner conductors extending from an innermost layer of a stator slot 18 and outer conductors extending from an outermost layer of the stator slot. The end turns 34 are also be defined by the same width, w, as shown in FIG. 1. Because the end turns 34 are arranged in a circular manner around the stator core, the outer conductors may be considered to define an outer diameter 31 for the end turns 34, and the inner conductors may be considered to define an inner diameter 29 for the end turns 34. The width of the end turns is the distance between the outer diameter 31 and the inner diameter 29.

Figure 4:
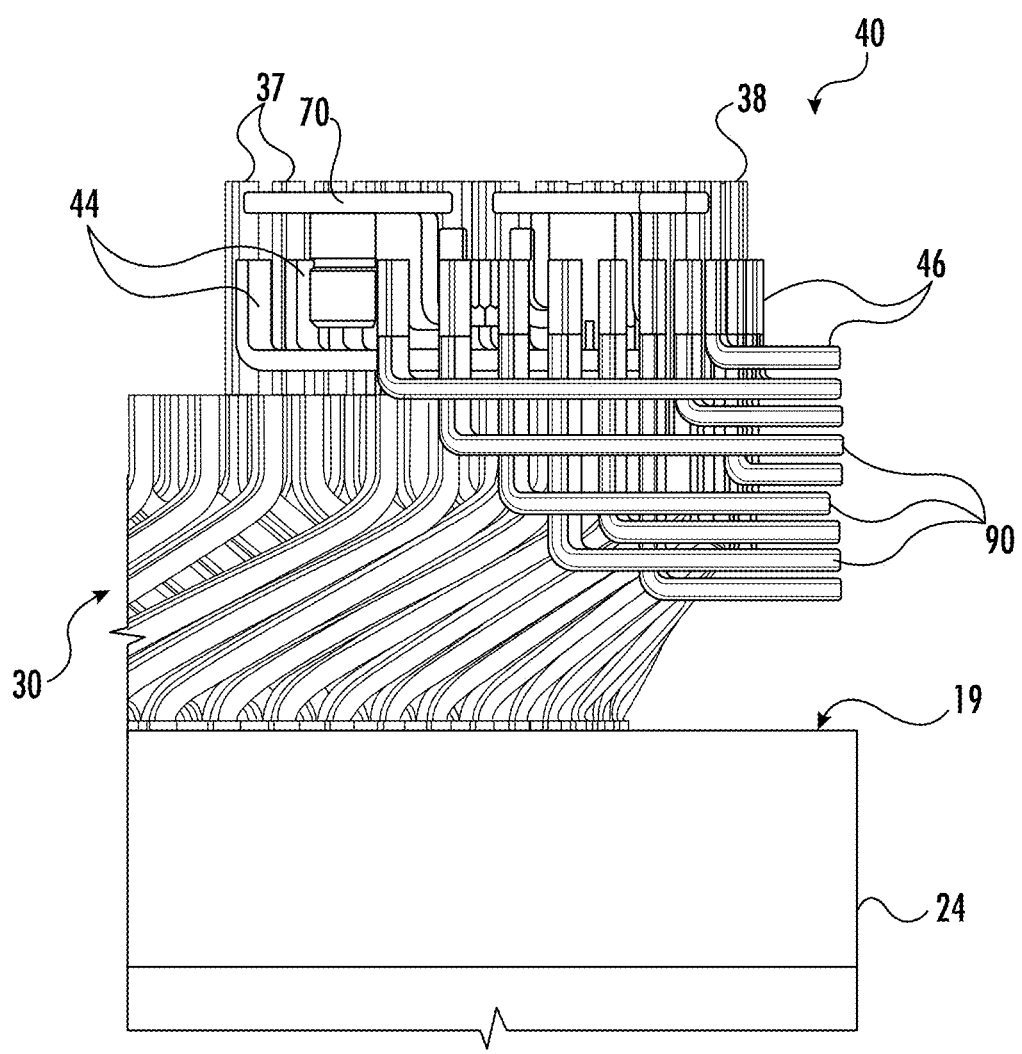
FIG. 4 is a side view of the bus bars and stator windings of FIG. 3.
Figure 5:
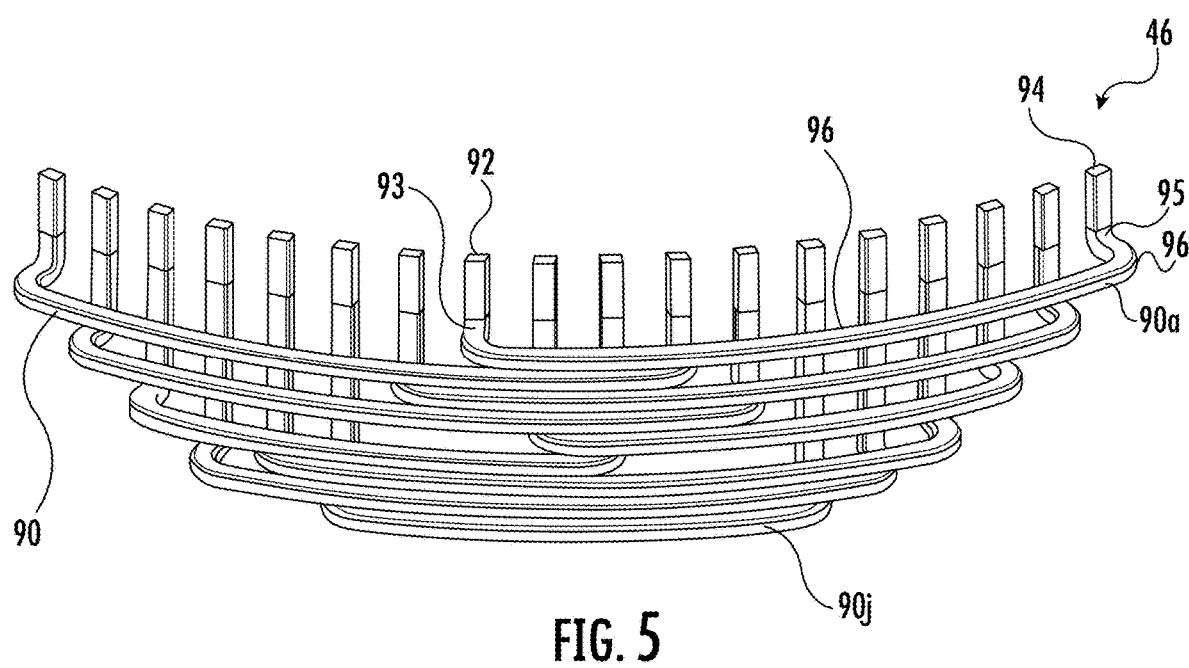
FIG. 5 is a perspective view of the outer diameter bus bars of the bus bar assembly of FIG. 2, the outer diameter bus bars shown in isolation from the encasement of the bus bar assembly.

The winding leads 36 are conductor portions (e.g., leg ends) that extend in the axial direction past the tips of the end turns 34. Each conductor forming a winding lead 36 is connected to an in-slot portion of the windings, and extends outward from the end turns 34. For example, as best shown in FIGS. 4 and 5, each of the winding leads 36 extends in an axial direction slightly past the end turns 34. In at least some embodiments, the winding leads 36 are bent conductors (e.g., in a similar manner to the leg ends that form adjacent leg ends for welding together), and thus have a radial or circumferential component. In other embodiments, one or more winding leads 36 may be leg ends that are not bent and extend directly out of a slot of the stator core 16 in the axial direction. In any event, each winding lead 36 extends away from a slot and terminates at an end. As explained in further detail below, the end of each lead 36 is joined to one of the bus bars of the bus bar assembly 40. It will be recognized that the connection between the leads 36 and the bus bars 42 may take any of various forms, such as soldering or welding (e.g., a tungsten inert gas (TIG) weld).

The windings 30 in the embodiments disclosed herein include a relatively large number of leads 36. As noted previously, the reason for a relatively large number of leads depends on the configuration of the winding 30, e.g., a three-phase winding with a relatively high number of slots per pole per phase, each phase including multiple paths, and multiple series connections extending between the multiple paths in each phase. Thirty-six total leads 36 are shown in the winding arrangement of FIGS. 1, 4 and 5.

The leads 36 include a set of inner leads 37 extending from an inner layer of the windings (and particularly, the innermost layer), and a set of outer leads 38 extending from an outer layer of the windings (and particularly, the outermost layer). The inner leads 37 and the outer leads 38 are both located on the same end of the stator core as the bus bar assembly (i.e., the weld end 28). The inner leads 37 include phase connection leads (e.g., leads for phase U, phase V and phase W of a three-phase winding arrangement) and neutral leads for the stator windings 30. The outer leads 38 are all winding path leads that connect various winding paths (e.g., leads for a series connection between two winding paths such that the two winding paths are connected to provide as a one longer winding path). An example of such a stator with inner layer winding leads and outer layer winding leads is shown in US Patent Application Publication No. US-2020-0244125, published Jul. 30, 2020, the contents of which are incorporated herein by reference in their entirety.

Bus Bar Assembly

Figure 2:
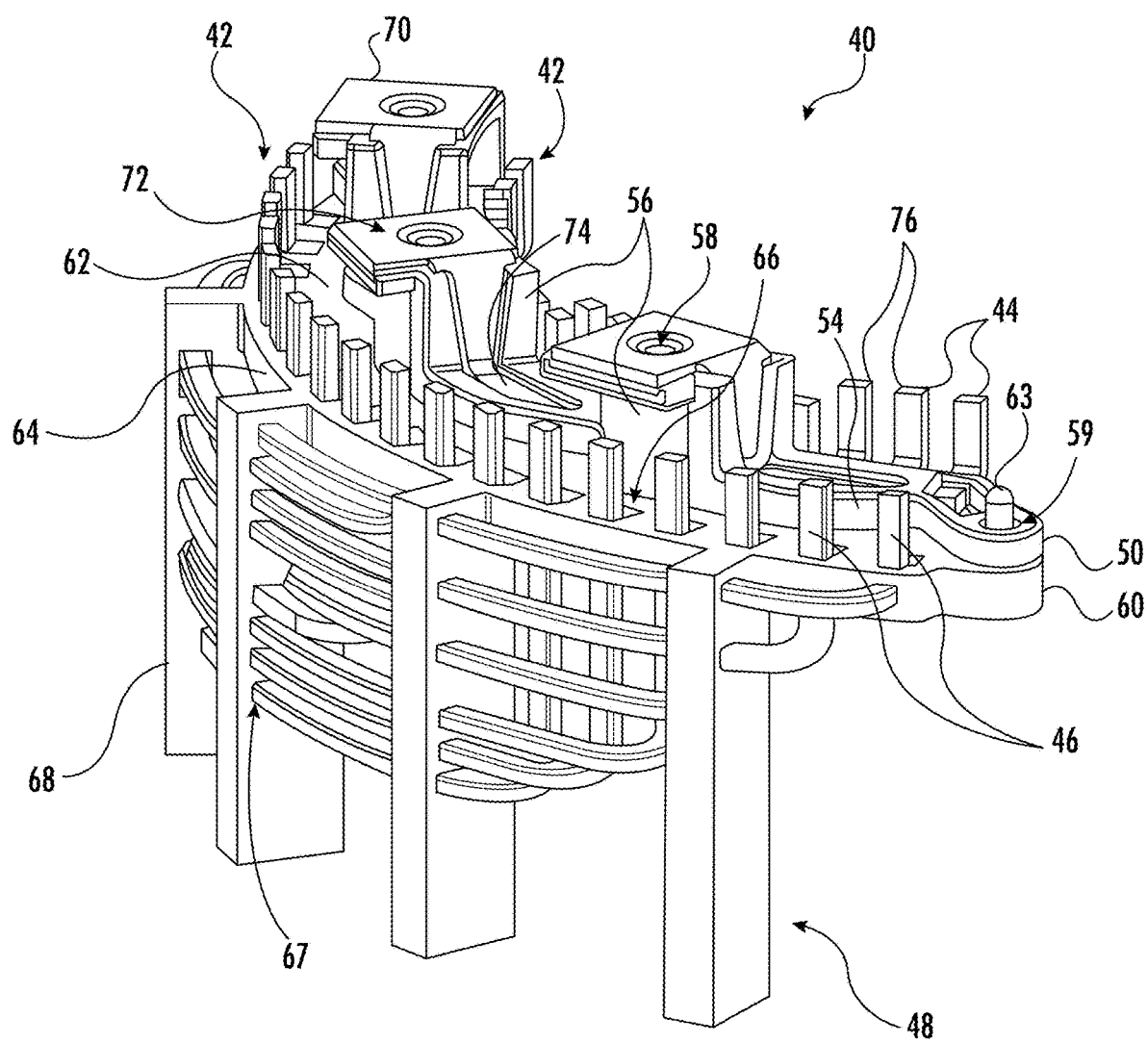
FIG. 2 is a perspective view of the bus bar assembly of FIG. 1 isolated from the stator core, the bus bar assembly including a two-part encasement and a plurality of bus bars embedded within the encasement.

With particular reference now to FIG. 2, the bus bar assembly 40 is shown in isolation from the stator assembly 12. The bus bar assembly 40 includes a plurality of electrically conductive bus bars 42 that are retained by a non-conductive support 48 (which support may alternatively be referred to as a "body" or "mount"). The bus bars 42 include inner bus bars 44 and outer bus bars 46. In the embodiment disclosed herein, the support 48 is a two-part structure that includes a non-conductive inner bus bar support 50 that retains the inner bus bars 44, and a non-conductive outer bus bar support 60 that retains the outer bus bars 46. The term "non-conductive" or "insulative" as used herein refers to an item comprised of a material that that does not readily conduct electricity, such as plastic/polymer, glass, porcelain, rubber, or any of various other materials as will be recognized by those of skill in the art. In contrast, the term "conductive" as used herein refers to an item comprised of a material that readily conducts electricity, such as copper, silver, aluminum, gold, or any of various other materials as will be recognized by those of skill in the art.

Inner Bus Bar Support

The inner bus bar support 50 is comprised of a non-conductive material. The inner bus bar support 50 is generally semi-circular in shape and includes an arc portion 52 that defines a plurality of passages for the inner bus bars 44. The arc portion 52 is defined by a semi-circular shape that is concentric with the circular cross-sectional shape of the stator core 14. The arc portion 52 includes a circumferential sidewall 54 that defines the perimeter of the arc portion 52, a first face that faces axially inward (not shown), and an opposing second face that faces axially outward (as shown in FIG. 2).

A plurality of terminal bridges 56 are positioned on the second face and extend axially outward on the support 50. In particular, each terminal bridge 56 extends outwardly on the second face and provides a platform such that a space is defined under (i.e., axially inward from) each platform. A platform hole 58 is defined on each terminal bridge 56 near the center of the associated platform. As explained in further detail below, each terminal bridge 56 is configured to support a terminal plate 72 of a phase connection bar 70 and allow a phase terminal post (not shown) to extend through the platform hole 58 and under the associated platform. In at least some embodiments, a terminal nut 71 (see FIG. 3) is positioned under each terminal bridge 56 and configured for threaded engagement with the terminal post.

The inner bus bar support 50 also includes at least one mounting hole 59. In the embodiment of FIGS. 2, the mounting hole 59 is positioned on one end of the arc portion 52 and extends through the arc portion 52, providing a passage from the first face to the second face. As explained in more detail below, the mounting hole 59 is configured to receive a post or other protuberance extending from the outer bus bar support 60 and allow the inner bus bar support 50 to be coupled to the outer bus bar support 60.

Inner Bus Bars

Figure 3:
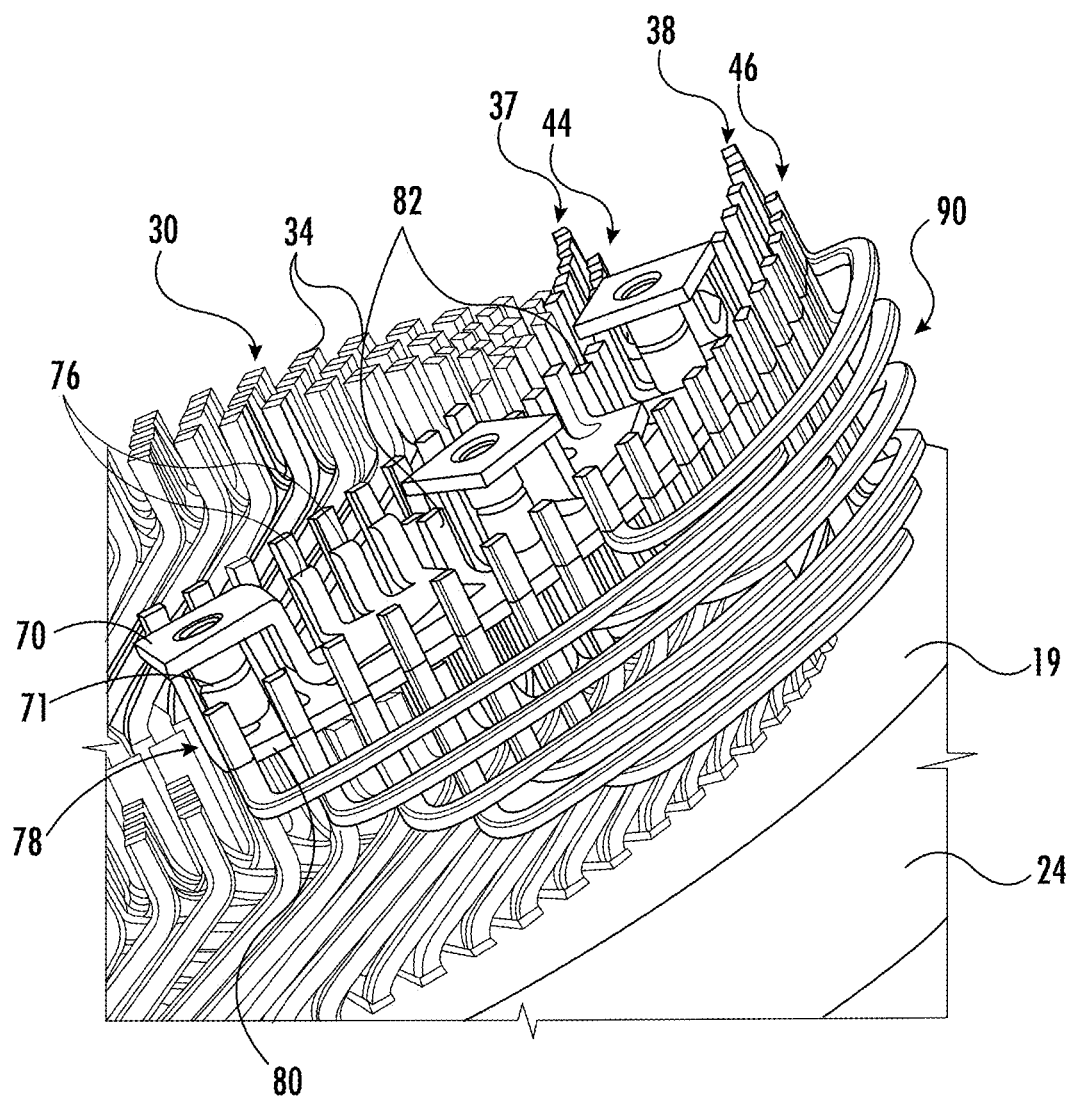
FIG. 3 is a perspective view of outer diameter bus bars and inner diameter bus bars of the bus bar assembly of FIG. 2, the bus bars shown in association with the stator windings but in isolation from the encasement of the bus bar assembly.

The inner bus bars 44 are all retained by and/or engage the inner bus bar support 50. The inner bus bars 44 include a plurality of phase connection bars 70 and a neutral connection bar 78 (the neutral connection bar 78 is best shown in FIG. 3). Each inner bus bar 44, including the phase connection bars 70 and the neutral connection bar 78, is comprised of a conductive material. As explained below, and as shown in FIGS. 1-5, all of the inner bus bars 44 are positioned axially outward from the tips of the end turns 34 and radially inward from the outer diameter 31 defined by the end turns.

As shown in FIGS. 2 and 3, three different phase connection bars 70 are included with the bus bar assembly 40 disclosed herein, with one phase connection bar associated with each phase of the three-phase winding. Each phase connection bar 70 includes a terminal plate 72, a circumferential extension 74, and a plurality of axial connection arms 76 (which may also be referred to herein as "axial arms").

Each terminal plate 72 is generally flat and has a rectangular shape. Each terminal plate 72 is configured to engage and rest upon the platform of one of the terminal bridges 56 of the inner support 50. The terminal plate 72 includes a hole that is similarly sized and aligned with the center hole 58 of the associated terminal bridge 56. As noted previously, because space is provided under the terminal bridge 56, a phase terminal (e.g., a bolt or similar structure) may be passed through the hole of the terminal plate 72 and the associated center hole 58 of the bridge, thus allowing the terminal to be connected to the phase connection bar 70.

The circumferential extension 74 of the phase connection bar 70 is a generally flat and elongated member that connects the terminal plate 72 to the axial arms 76. The circumferential extension 74 is retained within a passage of the inner bus bar support 50. To this end, the electrically insulating material (e.g., a polymer or other material) that forms the inner bus bar support 50 may be molded or otherwise formed around the circumferential extension during manufacture of the bus bar assembly 40. As a result, the bus bar support 50 and phase connection bars 70 are rendered as a unitary component wherein the individual phase connection bars 70 may not be removed from the bus bar support 50 without destruction of the support 50. In at least one alternative embodiment, after the phase connection bars 70 are engaged with the bus bar support 50, the bus bar support 50 is over molded with plastic, thus providing insulation for the phase connection bars 70 near the points of engagement with the inner bus bar support 50.

The axial arms 76 of each phase connection bar 70 extend away from the circumferential extension 74. Each axial arm 76 includes a proximal end connected to the circumferential extension 74 and a distal end configured for connection to the phase leads. While the proximal ends of the axial arms 76 may have a radial component, the distal ends of the axial arms 76 extend in an axial direction away from the circumferential extension 74. The distal ends of the axial arms 76 are pin-like structures having a similar cross-sectional size and shape to that of the winding leads 36, and are also similarly spaced apart. Accordingly, the distal ends of the axial arms 76 may be positioned adjacent to the inner leads 37 such that a weld or other connection may be easily completed between the axial arms 76 and the inner leads 37.

While the axial arms 76 are shown and been described herein as being pin-like members arranged in a row with each pin member having a substantially rectangular cross-sectional shape, it will be recognized that the axial arms 76 may alternatively be provided in other forms, shapes, and arrangements.

As best shown in FIG. 3, the neutral connection bar 78 includes a circumferential extension 80 and a plurality of axial connection arms 82 (which may also be referred to herein as "axial arms"). The circumferential extension 80 of the neutral connection bar 78 is a generally flat and elongated member with the plurality of axial arms 82 extending from an inner side of the bar. The circumferential extension is sandwiched or otherwise positioned between the inner bus bar support 50 and the outer bus bar support 60. For example, in at least one embodiment, the inner bus bar support 50 includes a passage that retains the circumferential extension 80. In at least one alternative embodiment, the circumferential extension 80 engages both the inner bus bar support 50 and the outer bus bar support 60.

The axial arms 82 extend away from the circumferential extension 80 of the neutral connection bar 78. Each axial arm 82 includes a proximal end connected to the circumferential extension 80 and a distal end configured for connection to the neutral leads. While the proximal ends of the axial arms 82 may have a radial component, the distal ends of the axial arms 82 extend in an axial direction away from the circumferential extension 80. The distal ends of the axial arms 82 are pin-like structures having a similar cross-sectional size and shape to that of the winding leads 36, and are also similarly spaced apart. Accordingly, the distal ends of the axial arms 82 may be positioned adjacent to the inner leads 37 such that a weld or other connection may be easily completed between the axial arms 82 and the inner leads 37.

Outer Bus Bar Support

The outer bus bar support 60 is comprised of a non-conductive material. The outer bus bar support 60 is generally semi-circular in shape includes an arc portion 62 with a plurality of axial legs 68 extending from the arc portion 62.

The arc portion 62 is defined by a semi-circular shape that is concentric with the circular cross-sectional shape of the stator core 14. The arc portion 62 includes a circumferential sidewall 64 that defines the perimeter of the arc portion 62, a first face that faces axially inward (not shown), and an opposing second face that faces axially outward (as shown in FIG. 2). The first face of the arc portion 62 is generally flat and configured to engage/rest upon the tips of the end turns 34 at the weld end 28 of the stator core. Similarly, the first face of the arc portion 52 of the inner bus bar support 50 is configured to engage/rest upon the second face of the arc portion 62 of the outer bus bar support 60. As noted previously, the neutral connection bar 78 is positioned between and/or sandwiched by the arc portion 52 of the inner bus bar support 50 and the arc portion 62 of the outer bus bar support 60.

The arc portion 62 further includes a plurality of holes 66 that provide passages through the outer bus bar support 60 from the first face to the opposing second face. Each hole 66 is designed and dimensioned to receive both an end of an outer bus bar 46 as well as an outer lead 38. The holes 66 are arranged in an evenly-spaced-apart manner near the sidewall 64 such that the similarly spaced outer leads 38 may be easily inserted through the holes without additional bending of the leads 38. Once the outer leads 38 are inserted through the holes, each outer lead 38 is adjacent to an end of an outer bus bar 46 such that a weld or other connection may be easily made between each adjacent outer lead and bus bar end.

The outer bus bar support 60 also includes at least one mounting post 63. In the embodiment of FIG. 2, the mounting post 63 is positioned on one end of the arc portion 62 and extends axially outward from the arc portion. The mounting post 63 is designed and dimensioned to pass completely through the mounting hole 59 on the inner bus bar support 50, as shown in FIG. 2. As a result, the inner bus bar support 50 is coupled to and retained in place by the engagement of the mounting post 63 with the mounting hole 59. In at least some embodiments, the post 63 may be heat staked, welded, or otherwise deformed in order to permanently secure the inner bus bar support 50 to the outer bus bar support 60. Following deformation of the post 63, the first bus bar support 50 and second bus bar support 60 are rendered as a unitary component wherein the two supports may not be removed from one another without destruction of the bus bar assembly 40.

The axial legs 68 of the outer bus bar support 60 are integrally formed with arc portion 62 along the sidewall 64, and extend downward (i.e., axially inward) from the arc portion 62. The legs 68 are substantially solid but include a number of holes 67 formed therein. The holes 67 provide passages through the legs 68 for the outer bus bars 46. Each of the axial legs 68 has a length that is substantially equivalent to the height of the end turns 34 of the winding arrangement 30. Accordingly, when the first face of the arc portion 62 is engaged with the tips of the end turns 34, the legs 68 of the outer bus bar support have a sufficient length to abut the shoulder 19 of the stator core 14. As shown in FIG. 1, the legs 68 may all be connected by feet 69 that extend between the legs 68 along the shoulder 19 of the stator core 14.

In addition to the holes 67 in the legs 68, similar holes are also provided in the arc portion 62. It will be recognized that these the holes 67 along with the legs 68 are all arranged in a spaced-apart relation, and thus provide associated clearances between the series connection bars (i.e., outer bus bars 46). These clearances advantageously allow for oil or air cooling of the series connection bars/bus bars 46 and the windings in the area of the outer bus bar support 60.

Outer Bus Bars

The outer bus bars 46 are all retained by the outer bus bar support 60. In the disclosed embodiment, all of the outer bus bars 46 are series connection bars formed from conductor segments having two ends. As explained below, and as shown in FIGS. 1-5, all of the outer bus bars 46 are positioned radially outward from the end turns 34, radially inward from the outer diameter 24 of the stator core, and axially inward from the tips of the end turns 34.

Each outer bus bar 46 is comprised of a conductive material, and in at least one embodiment, each outer bus bar 46 is comprised of a wire segment having the same cross-sectional shape and size as the insulated copper wire that is used to form the windings 30. The wire segments are also coated with insulative material, such as polyester, amide imide, or PEEK. Similar to the leg ends of the U-shaped conductors used to form the windings 30, the ends of the wire used for the outer bus bars 46 is also trimmed to expose the conductive material such that the ends may be easily connected to the outer leads 38 of the windings 30.

As shown in FIGS. 1-5, each outer bus bar 46 is provided by a U-shaped conductor segment 90 having a first end 92 extending in an axial direction, a first radially outward bend 93 connected to the first end, a second end 94 extending in the axial direction, a second radially outward bend 95 connected to the second end, and an elongated circumferential portion 96 extending in a circumferential direction between the first bend 93 and the second bend 95. The first end 92 and the second end 94 of each conductor segment 90 extend in the axial direction (i.e., parallel to center axis 20 defined by the stator core), and are thus configured for alignment with the outer leads 38 of the windings 30. The radially outward bends 93, 95 transition the shape of each outer bus bar 46 from the axial to the radial direction (i.e., perpendicular to the center axis 20 of the stator core and extending away from the windings 30). The elongated circumferential portion 96 then extends in a circumferential direction between the radially outward bends 93, 95 (i.e., perpendicular to the axial direction and concentric/aligned with the inner diameter of the stator core).

It will be recognized that the structure of each outer bus bar 46 is simple and involves a single length of conductor that extends between two ends 92, 94. These two ends 92, 94 are used to connect to two outer leads 38 from different paths of the winding 30. Accordingly, each of the outer bus bars 46 is used to provide a series connection between two winding paths.

As noted above, the ends 92, 94 of the outer bus bars 46 are pin-like structures having a similar cross-sectional size and shape to that of the outer leads 38 of the winding 30. Thus, the ends 92, 94 may be easily positioned adjacent to the outer leads 38, and this facilitates connecting the ends 92, 94 to the outer leads 38 (e.g., by welding or similar connection).

Although each of the U-shaped conductor segments 90 has a similar shape, it will be recognized that these shapes are not exactly the same. Specifically, while the axial lengths of the first and second ends 92, 94 are the same one bus bar, the axial lengths of the first and second ends 92, 94 are different on different bus bars. For example, as shown in FIG. 5, the axial lengths of the first and second ends 92, 94 of first conductor segment 90a is significantly shorter than the axial length of the first and second ends of the ninth conductor segment 90j. This difference in the axial lengths of the first and second ends allows each of the circumferential portions 96 to be arranged in different axial planes that are separated from one another such that the circumferential portions 96 do not intersect or overlap on the bus bar assembly 40. This also allows all of the circumferential portions 96 to be arranged axially on top of one another (or in other words, at the same radial distance from the outer diameter of the stator core). Additionally, the length of different circumferential portions 96 are not uniform, as different circumferential portions extend a different number of slots. For example, the circumferential length of the first conductor segment 90a is greater than the circumferential length of the ninth conductor segment 90j.

As noted previously, the outer bus bars 46 are all retained by the outer bus bar support 60. Specifically, as shown in FIGS. 1 and 2, each of the conductor segments 90 extends through a plurality of passages in the outer bus bars support 60 such that the U-shaped conductor segments are non-removably retained within the outer bus bar support 60. These passages include the holes 66 that pass the ends 92, 94 of the outer bus bars 46, as well as the holes 67 in the legs 68 that provide passages for the elongated circumferential portions 96. To this end, the electrically insulating material (e.g., a polymer or other material) that forms the outer bus bar support 60 may be molded or otherwise formed around various parts of the conductor segments 90 during manufacture of the bus bar assembly 40. As a result, the bus bar support 60 and conductor segments 90 are rendered as a unitary component wherein the individual conductor segments 90 may not be removed from the bus bar support 60 without destruction of the support 60. While the bus bar support 60 is formed around portions of the conductor segments 90 (e.g., at holes 66 and 67), it will be recognized that extended portions of the conductor segments are not encased by the bus bar support 60, and thus oil or other cooling fluid is allowed to flow around the conductor segments 90 during operation of the stator, thus providing effective cooling of the bus bar assembly 40 and the associated windings 30.

Installation and Operation

In view of the foregoing description, it will be recognized that the bus bar assembly 40 is configured with the inner bus bars 44 and outer bus bars 46 are arranged on the stator 12 such that the stator has a reduced axial length and reduced footprint. In particular, the inner bus bars 44 are positioned axially outward from tips of the end turns 34 and radially inward from the outer diameter of the end turns 34. At the same time, the outer bus bars 46 are positioned axially inward from the tips of the end turns 34 and radially outward from the outer diameter of the end turns. The inner bus bars 44 are configured for connection to inner leads 37, including phase leads and neutral leads, extending from the inner layer of the windings. The outer bus bars 46 are configured for connection to outer leads 38, which are winding path leads, extending from the outer layer of the windings.

The arrangement of the bus bar assembly 40 on the stator also provides for an improved support arrangement for the bus bar. In particular, when the bus bar assembly 40 is arranged on a stator 12, the outer bus bar support 60 is configured to engage/rest upon the tips of the end turns 34 of the windings 30, and the inner bus bar support 50 is configured to engage/rest upon the outer bus bar support 60. At the same time, the axial legs 68 of the outer bus bar support 60 extend axially along the outer diameter of the end turns for the length of the end turns 34 and engage/rest upon the shoulder 19 of the stator core 14. This provides enhanced stability for the bus bar assembly when positioned on the stator 12. Furthermore, the entire bus bar assembly 40, including the inner bus bar support 50 and outer bus bar support 60, does not extend radially past of the outer diameter of the stator core. This results in both a reduced size of the stator 12 as well as improved stability for the bus bar assembly 40. Moreover, because large sections of the bus bars 42 are exposed within the bus bar assembly 40, cooling fluid is allowed to flow between the bus bars and maintain a reduced temperature in the stator windings.

ALTERNATIVE EMBODIMENTS

Figure 6:
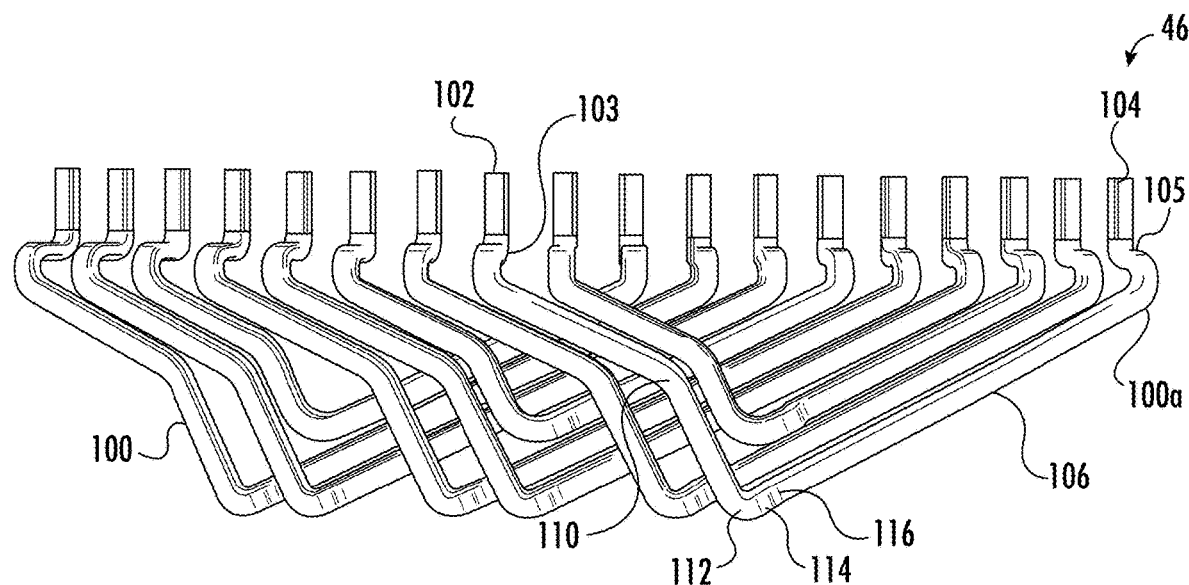
FIG. 6 is a perspective view of the outer diameter bus bars and inner diameter bus bars of an alternative embodiment of the bus bar assembly of FIG. 1, the bus bars shown in association with the stator windings and in isolation from the encasement of the bus bar assembly.
Figure 7:
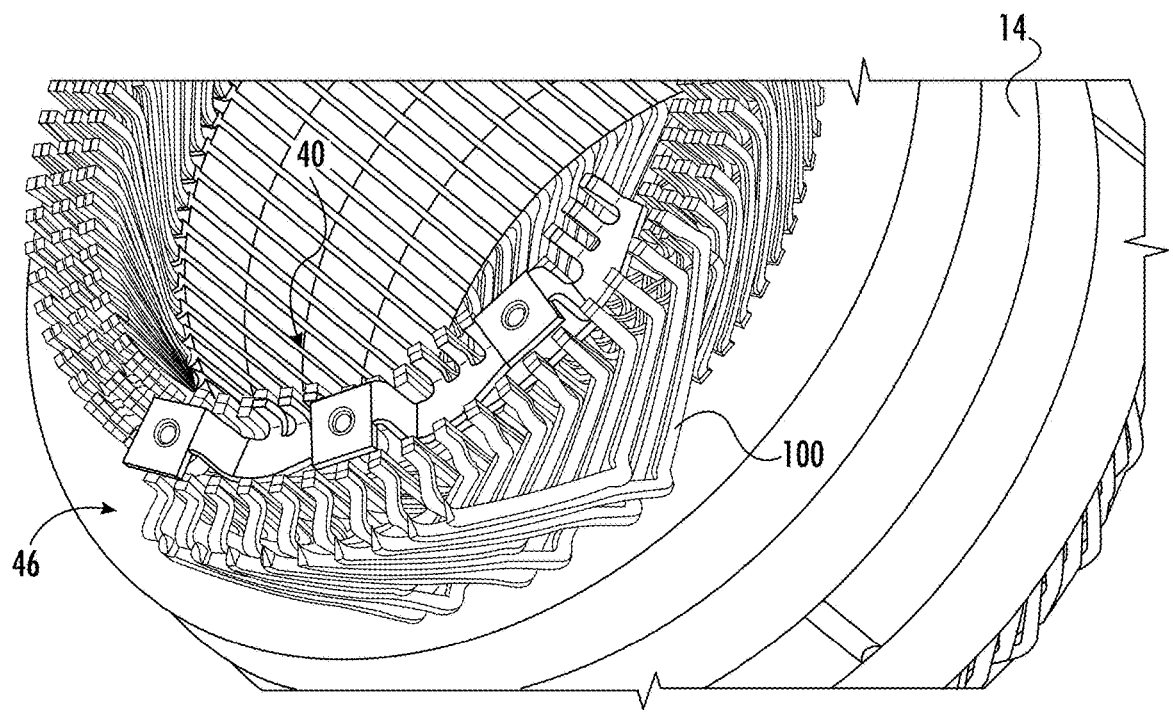
FIG. 7 is an axial end view of the bus bars of FIG. 6.

With reference now to FIGS. 6 and 7, a first alternative embodiment of the outer bus bars 46 is shown. In this embodiment, the outer bus bars 46 are provided as V-shaped conductor segments 100, as opposed to the U-shaped conductor segments 90 shown in FIGS. 1-5. Each V-shaped conductors segment 100 includes a first end 102 extending in an axial direction, a first radially outward bend 103 connected to the first end 102, a second end 104 extending in the axial direction, a second radially outward bend 105 connected to the second end 104, and an elongated portion 106 extending axially and circumferentially between the first bend 103 and the second bend 105. The first end 102 and the second end 104 of each conductor segment 100 extend in the axial direction (i.e., parallel to center axis 20 defined by the stator core), and are thus configured for alignment with the outer leads 38 of the windings 30. The radially outward bends 103, 105 transition the shape of each outer bus bar 46 from the axial to the radial direction (i.e., perpendicular to the center axis 20 of the stator core and extending away from the windings 30). The elongated portion 106 defines a route that is generally V-shaped and extends between the radially outward bends 103, 105.

The route defined by the elongated portion 106 is generally defined by axial and circumferential components (i.e., generally parallel with the surface defined by the inner diameter of the core), but may also include additional radial components. Thus, in addition to a bend that defines the apex for the V-shape, the elongated portion 106 also includes one or more additional bends that adjust the route in some manner. For example, the elongated portion 106 of conductor segment 100a shown in FIG. 6 includes a first bend 110 that defines a slight turn of approximately 30° downward (i.e., the defined route takes a more axial turn at bend 110). Conductor segment 100a also includes a second bend 112 that defines a turn of approximately 90° upward (i.e., the trajectory of the route changes from moving axially downward and circumferential to axially upward and circumferential at bend 112; this bend also defines the apex for the V-shape). Conductor segment 100a further includes a third bend 114 that moves the route slightly radially inward (i.e., toward the end turns 34), and a fourth bend 116 that causes the route to continue on the previous axially upward and circumferential trajectory. The remainder of the route for the elongated portion 106 is then maintained until the V-shaped portion is joined to the second end 102.

FIG. 7 shows the outer bus bars of FIG. 6 positioned on the windings. As shown in the figure, the ends 102, 104 of the V-shaped conductors 100 are aligned with the outer leads 38, thus allowing for quick and easy connection between each end 102, 104 and one of the outer leads 38. The elongated portions 106 are routed along paths that first move axially downward, pivot at an apex, and then move axially upward, as defined above. The bends (e.g., 110, 112, 114, 116) route each elongated portion 106 in a manner that avoids the elongated portions of the other V-shaped conductors, and some of the conductors are nested within other conductors (e.g., 110c nested within 110a). Because of the separation between the V-shaped conductors 100, cooling fluid is allowed to flow between each of the V-shaped conductors 100 during operation of the electric machine.

Figure 8:
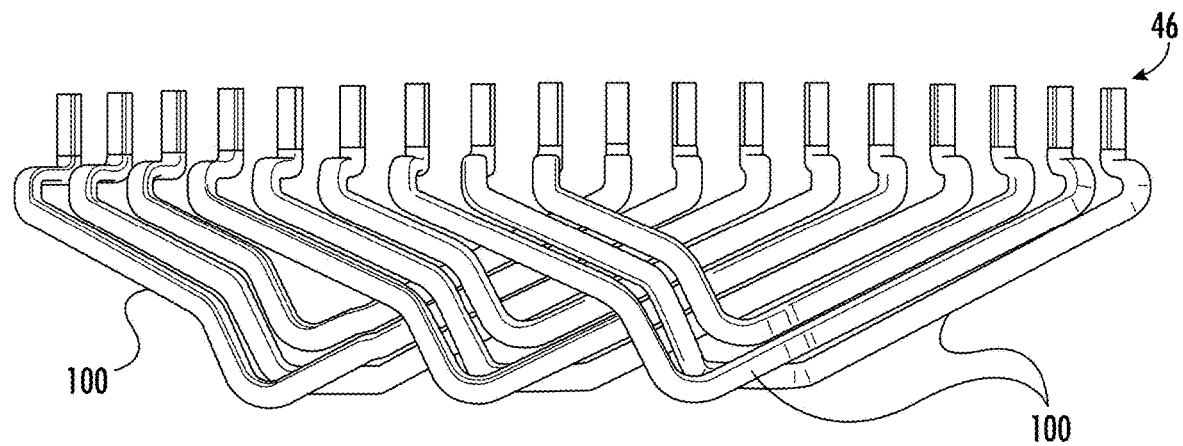
FIG. 8 is an axial end view of an alternative embodiment of the bus bars of FIG. 7.
Figure 9:
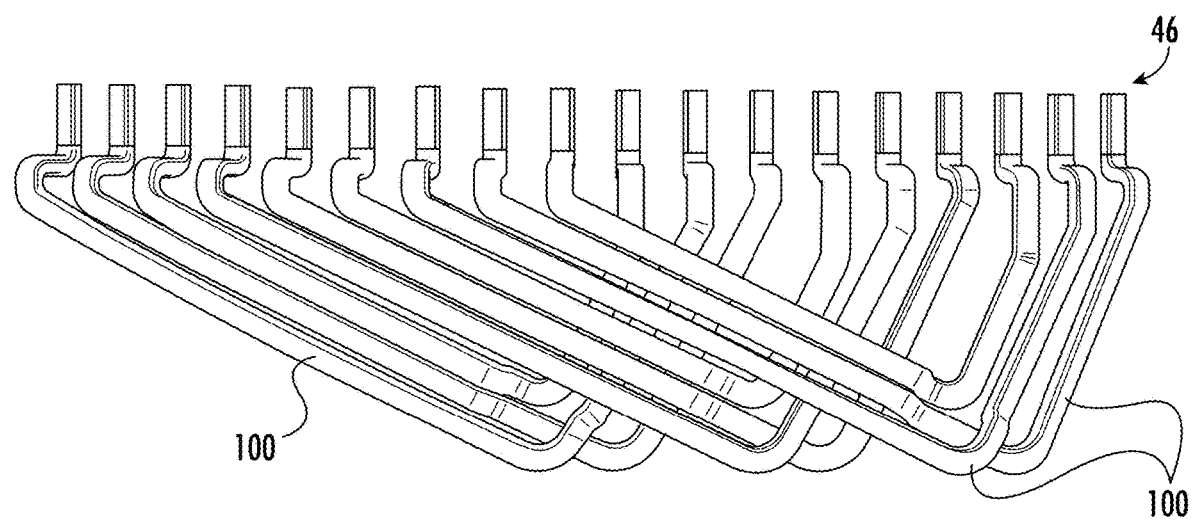
FIG. 9 is an axial end view of another alternative embodiment of the bus bars of FIG. 7.

While FIGS. 6 and 7 show that alternative configurations of the outer bus bars 46, it will be recognized that further alternative configurations are also contemplated. For example, FIGS. 8 and 9 two additional embodiments of the outer bus bars 46 that are similar to those of FIG. 6, and make similar series connections between the outer leads, but the outer bus bars 46 in FIGS. 8 and 9 are shaped differently and include different bends than those of FIG. 6. The different shapes, bends, and over-under relationships between the bus bars allows for different nesting and overlapping configurations between the bus bars and also facilitates different lead connections for different winding arrangements.

The foregoing detailed description of one or more embodiments of the stator with outer diameter bus bar connection has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. A stator for an electric machine, the stator comprising:
a cylindrical core defining an inner cylindrical surface and an outer cylindrical surface with a plurality of slots formed between the inner cylindrical surface and the outer cylindrical surface;
windings positioned on the cylindrical core, the windings including in-slot portions extending through the slots, end turns, and leads, the leads of the windings including a plurality of inner leads associated with conductors in an inner layer of the slots and a plurality of outer leads associated with conductors in an outer layer of the slots; and
a bus bar assembly including a plurality of inner bus bars and a plurality of outer bus bars, the plurality of inner bus bars connected to the plurality of inner leads, and the plurality of outer bus bars connected to the plurality of outer leads, wherein the plurality of outer bus bars are positioned radially outward from the end turns of the windings and radially inward from the outer cylindrical surface, the bus bar assembly further including a first support member comprised of a non-conductive material and a second support member comprised of a non-conductive material, wherein the first support member is distinct from the second support member, wherein at least some of the plurality of inner bus bars extend through the first support member, and wherein at least some of the plurality of outer bus bars extend through the second support member.

2. The stator of claim 1 wherein the inner leads include a plurality of phase leads and a plurality of neutral leads, and wherein the outer leads include a plurality of winding path leads.

3. The stator of claim 2 wherein the inner bus bars include at least three phase connections connected to the phase leads and at least one neutral connection, and wherein the each of the outer bus bars provides a series connection between two winding path leads.

4. The stator of claim 1 wherein the plurality of inner leads extend in an axial direction and the inner bus bars include axial connection arms positioned adjacent to the inner leads, and wherein the plurality of outer leads extend in the axial direction and the outer bus bars include axial connection arms positioned adjacent to the outer leads.

5. The stator of claim 1 wherein the second support member includes at least one arc portion positioned axially outward from the end turns and at least one axial leg extending between the arc portion and a shoulder of the cylindrical core.

6. A stator for an electric machine, the stator comprising:
a core defining a plurality of slots;
windings positioned on the core, the windings including in-slot portions, end turns, and leads, the leads of the windings including a plurality of inner leads associated with conductors in an inner layer of the slots and a plurality of outer leads associated with conductors in an outer layer of the slots; and
a bus bar assembly including a plurality of inner bus bars and a plurality of outer bus bars retained by a support, the plurality of inner bus bars connected to the plurality of inner leads, and the plurality of outer bus bars connected to the plurality of outer leads, wherein the plurality of inner bus bars are positioned axially outward from tips of the end turns, and wherein the plurality of outer bus bars are positioned radially outward from the end turns and axially inward from the tips of the end turns,
wherein the support includes a first support member comprised of a non-conductive material and a second support member comprised of a non-conductive material, wherein the first support member is distinct from the second support member, wherein at least some of the plurality of inner bus bars are retained by the first support member, and wherein the plurality of outer bus bars are retained by the second support member.

7. The stator of claim 6 wherein the in-slot portions are positioned in slots of the core, the end turns of the windings extend from the in-slot portions at opposite ends of the core, and the leads of the windings extend from the in-slot portions at one of the ends of the core with the leads extending past the end turns in an axial direction.

8. The stator of claim 7 wherein the inner layer of the slots is an innermost layer and the outer layer of the slots is an outermost layer.

9. The stator of claim 8 wherein the plurality of inner bus bars are further positioned radially inward from the plurality of outer bus bars.

10. The stator of claim 9 wherein both the plurality of inner bus bars and the plurality of outer bus bars are further positioned radially inward from an outer diameter of the core and radially outward from an inner diameter of the core.

11. The stator of claim 6 wherein the first support member includes a first arc portion, wherein the second support member includes a second arc portion, wherein one side of the second arc portion faces the first arc portion, and wherein another side of the second arc portion engages the tips of the end turns.

12. The stator of claim 11 wherein the first support member includes a plurality of terminal bridges that extend axially outward from the first arc portion, and wherein the second support member includes a plurality of axial legs that extend away from the second arc portion and engage the core.

13. The stator of claim 12 wherein the plurality of inner bus bars include phase bus bars, each phase bus bar including a terminal plate that engages one of the terminal bridges.

14. The stator of claim 13 wherein each of the outer bus bars is provided by a V-shaped conductor segment having a first end extending in an axial direction, a first radially outward bend connected to the first end, a second end extending in the axial direction, a second radially outward bend connected to the second end, and a V-shaped portion extending between the first bend and the second bend along a route that includes circumferential components, axial components and radial components.

15. The stator of claim 6 wherein the plurality of inner bus bars include a neutral bar positioned between the first support member and the second support member.

16. The stator of claim 6 wherein each of the outer bus bars is provided by a U-shaped conductor segment having a first end extending in an axial direction, a first radially outward bend connected to the first end, a second end extending in the axial direction, a second radially outward bend connected to the second end, and an elongated circumferential portion extending between the first bend and the second bend in a circumferential direction.

17. The stator of claim 16 wherein the elongated circumferential portions of the outer bus bars are separated and positioned in distinct planes, and wherein each of the elongated circumferential portions extends through an axial leg of the support.

18. The stator of claim 6 wherein the plurality of outer bus bars provide at least one series connection between two winding paths that end at the outer leads, and wherein each of the plurality of outer bus bars (i) has a same cross-sectional shape as the leads of the windings, (ii) is coated with an insulative material, and (iii) includes a trimmed end that exposes conductive material of the bus bar on the trimmed end.

19. A bus bar assembly comprising:
a plurality of inner bus bars including a plurality of phase connection bars and a neutral connection bar, each of the inner bus bars including a circumferential portion and a plurality of axial connection arms;
a first support engaging each of the inner bus bars, the first support including a first non-conductive arc portion;
a plurality of outer bus bars positioned radially outward from the plurality of inner bus bars, each of the outer bus bars including a circumferential portion extending between two axial connection arms; and
a second support engaging each of the outer bus bars, the second support including a second non-conductive arc portion with at least one axial leg extending from the second non-conductive arc portion, and wherein the neutral connection bar is positioned between the first support and the second support.

20. The bus bar assembly of claim 19 wherein at least some of the plurality of inner bus bars extend through the first support, and wherein at least some of the plurality of outer bus bars extend through the second support.

* * * * *